United States Patent
Carroll et al.

(10) Patent No.: US 6,370,248 B1
(45) Date of Patent: Apr. 9, 2002

(54) SYNCHRONIZING AUTONOMOUS CHAOTIC SYSTEMS USING FILTERS

(75) Inventors: Thomas L. Carroll; Gregg A. Johnson, both of Alexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/126,711

(22) Filed: Jul. 31, 1998

(51) Int. Cl.[7] .............................. H04L 9/26; H04L 9/12
(52) U.S. Cl. .................. 380/263; 380/46; 380/260; 380/262; 708/300
(58) Field of Search ...................... 380/28, 41, 44, 380/46, 47, 260, 261, 262, 263; 708/300, 309

(56) References Cited

U.S. PATENT DOCUMENTS

| | | | | |
|---|---|---|---|---|
| 5,177,785 A | * | 1/1993 | Itani et al. ................. 380/6 |
| 5,923,760 A | * | 7/1999 | Abarbanel et al. ......... 380/34 |
| 5,930,364 A | * | 7/1999 | Kim ............................ 380/28 |
| 6,049,614 A | * | 4/2000 | Kim ............................ 380/48 |

* cited by examiner

*Primary Examiner*—Gail Hayes
*Assistant Examiner*—Justin T. Darrow
(74) *Attorney, Agent, or Firm*—John J. Karasek; Larry Root

(57) ABSTRACT

A system for synchronizing chaotic transmitters and receivers that is less sensitive to channel effects than other known chaotic communication methods. The system employs duplicate transmitter and receiving modules and in addition to the chaotic output a synchronizing signal which occupies a reduced bandwidth. The small bandwidth affords the system a greater resistance to the affects of frequency dependent channel distortion and noise. The broad band chaotic signal is transmitted and appears to be noise to an unauthorized listener. The receiving unit employs band pass filtering, and when the signal is received the receiver filters the chaotic signal through band pass filters which eliminate channel noise and make gain control easier to implement.

6 Claims, 12 Drawing Sheets

SYNCHRONIZING AUTONOMOUS CHAOTIC SYSTEMS USING FILTERS

FIELD OF THE INVENTION

The present invention relates generally to synchronizing chaotic systems and more particularly a system which allows the synchronizing of one chaotic system to another chaotic system using only a narrow band signal.

DESCRIPTION OF THE RELATED ART

A synchronized nonlinear system can be used as an information transfer system. The transmitter, responsive to an information signal, produces a drive signal for transmission to the receiver. An error detector compares the drive signal and the output signal produced by the receiver to produce an error signal indicative of the information contained in the information signal.

It is known to those skilled in the art that a nonlinear dynamical system can be driven (the response) with a signal from another nonlinear dynamical system (the drive). With such a configuration the response system actually consist of duplicates of subsystems of the drive system, which are cascaded and the drive signal, or signals, come from parts of the drive system that are included in the response system. FIG. 1 shows a cascaded chaotic system 100 known in the prior art. Drive system 100 comprises a chaotic drive circuit 140, housed in transmitter system 139, and a chaotic response circuit 160, housed in a receiver system 166. Chaotic drive circuit comprises subsystems 198 and 199 which are duplicated by subsystem 169 and 170 in the response circuit. A nonlinear function 150 is contained in drive circuit 140 and is used to drive the system into chaotic operation.

A chaotic system has extreme sensitivity to initial conditions. The same chaotic system started at infinitesimally different initial conditions may reach significantly different states after a period of time. Lyapunov exponents (also known in the art as "characteristic exponents") measure this divergence. A system will have a complete set of Lyapunov exponents, each of which is the average rate of convergence (if negative) or divergence (if positive) of nearby orbits in phase space as expressed in terms of appropriate variables and components.

Sub or Conditional Lyapunov exponents are characteristic exponents which depend on the signal driving the system. It is also known to those skilled in the art that, if the sub-Lyapunov, or conditional Lyapunov, exponents for the driven response system are all negative, then all signals in the response system will converge over time or synchronize with the corresponding signals in the drive. When the response system is driven with the proper signal from the drive system, the output of the response system is identical to the input signal. When driven with any other signal, the output from the response is different from the input signal.

In brief, a dynamical system can be described by the equation $$d\alpha/dt = f(\alpha). \quad (1)$$

The system is then divided into two subsystems. $\alpha = (\beta, \chi)$;

$$d\beta/dt = g(\beta, \chi)$$

$$d\chi/dt = h(\beta, \chi) \quad (2)$$

where $\beta = (\alpha_1 \ldots \alpha_n)$, $g = (f_1(\alpha) \ldots f_n(\alpha))$, $h = (f_{n+1}(\alpha) \ldots f_m(\alpha))$, $\chi = (\alpha_{n+1}, \ldots \alpha_m)$, where $\alpha$, $\beta$ and $\chi$ are measurable parameters of a system, for example vectors representing a electromagnetic wave.

The division is arbitrary since the reordering of the $\alpha_i$ variables before assigning them to $\beta$, $\chi$ g and h is allowed. A first response system is created by duplicating a new subsystem $\chi'$ identical to the $\chi$ system, and substituting the set of variables $\beta$ for the corresponding $\beta'$ in the function h, and augmenting Eqs. (2) with this new system, giving, $$d\beta/dt = g(\beta, \chi),$$

$$d\chi/dt = h(\beta, \chi) \quad (3)$$

$$d\chi'/dt = h(\beta, \chi').$$

If all the sub-Lyapunov exponents of the $\chi'$ system (i.e. as it is driven) are less than zero, then $[\chi'-\chi] \to 0$ as t infinity. The variable $\beta$ is known as the driving signal.

One may also reproduce the $\beta$ subsystem and drive it with the $\chi'$ variable, giving $$d\chi/dt = g(\beta, \chi),$$

$$d\chi/dt = h(\beta, \chi),$$

$$d\chi'/dt = h(\beta, \chi'). \quad (4)$$

$$d\chi'/dt' = g(\beta'', \chi')$$

The functions h and g may contain some of the same variables. If all the sub-Lyapunov exponents of the $\chi'$, $\beta''$ subsystem (i.e. as it is driven) are less than 0, then $\beta'' \to \beta$ as t→infinity. The example of the eqs. (4) is referred to as cascaded synchronization. Synchronization is confirmed by comparing the driving signal $\beta$ with the signal $\beta''$.

Generally, since the response system is nonlinear, it will only synchronize to a drive signal with the proper amplitude. If the response system is at some remote location with respect to the drive system, the drive signal will probably be subjected to some unknown attenuation. This attenuation can be problematic to system synchronization.

It is also known by those skilled in the art, that it is possible to pass chaotic signals from a drive system through some linear or nonlinear function and use the signals from the response system to invert that function as discussed, for example, in Carroll, et al., "Transforming Signals with Chaotic Synchronization," Phys. Rev. E. Vol. 54, p. 4676 (1996).

The present invention builds on the design of three previous inventions, the synchronizing of chaotic systems, U.S. Pat. No. 5,245,660, the cascading of synchronized chaotic systems, U.S. Pat. No. 5,379,346, and a method for synchronizing nonlinear systems using a filtered signal, U.S. Pat. No. 5,655,022 each herein incorporated by reference. The present invention extends those principles to allow the synchronization of a broad band chaotic receiver to a broad band chaotic transmitter, using only a narrow band chaotic signal.

SUMMARY OF THE INVENTION

It is therefore an object of the invention to provide systems for producing synchronized signals, and particularly nonlinear dynamical (chaotic) systems.

Another object of the invention is to provide a chaotic communications system for encryption utilizing synchronized nonlinear transmitting and receiving circuits using a narrow-band version of the chaotic signal to synchronize the broader band chaotic transmitter and receiver.

A further object of the invention is to provide a chaotic communication system which employs a narrow band version of the chaotic signal for synchronizing transmitter and receiver units to facilitate efficient use on existing telephone or FM radio channels.

The present invention is an autonomous system design featuring subsystems which are nonlinear and possibly chaotic, but will still synchronize when the drive signal is attenuated or amplified by an unknown amount. The system uses filters to produce a narrow band version of the wideband chaotic signal to synchronize the chaotic transmitter to the chaotic receiver. The small bandwidth affords the system a greater resistance to the effects of noise, specifically the systems resistance to channel distortion and accompanying phase shifts is greatly increased by employing a narrow band. The broad band chaotic signal is transmitted and appears to be noise to an unauthorized listener. The receiving unit employs band pass filtering, and when the signal is received the receiver filters the broadband chaotic signal. The filters produce a narrowband chaotic signal and that narrowband signal is used to synchronize the transmitter and receiver.

BRIEF DESCRIPTION OF THE DRAWING FIGURES

DETAILED DESCRIPTION OF THE PREFERRED EMBODIMENTS

Figure 1:
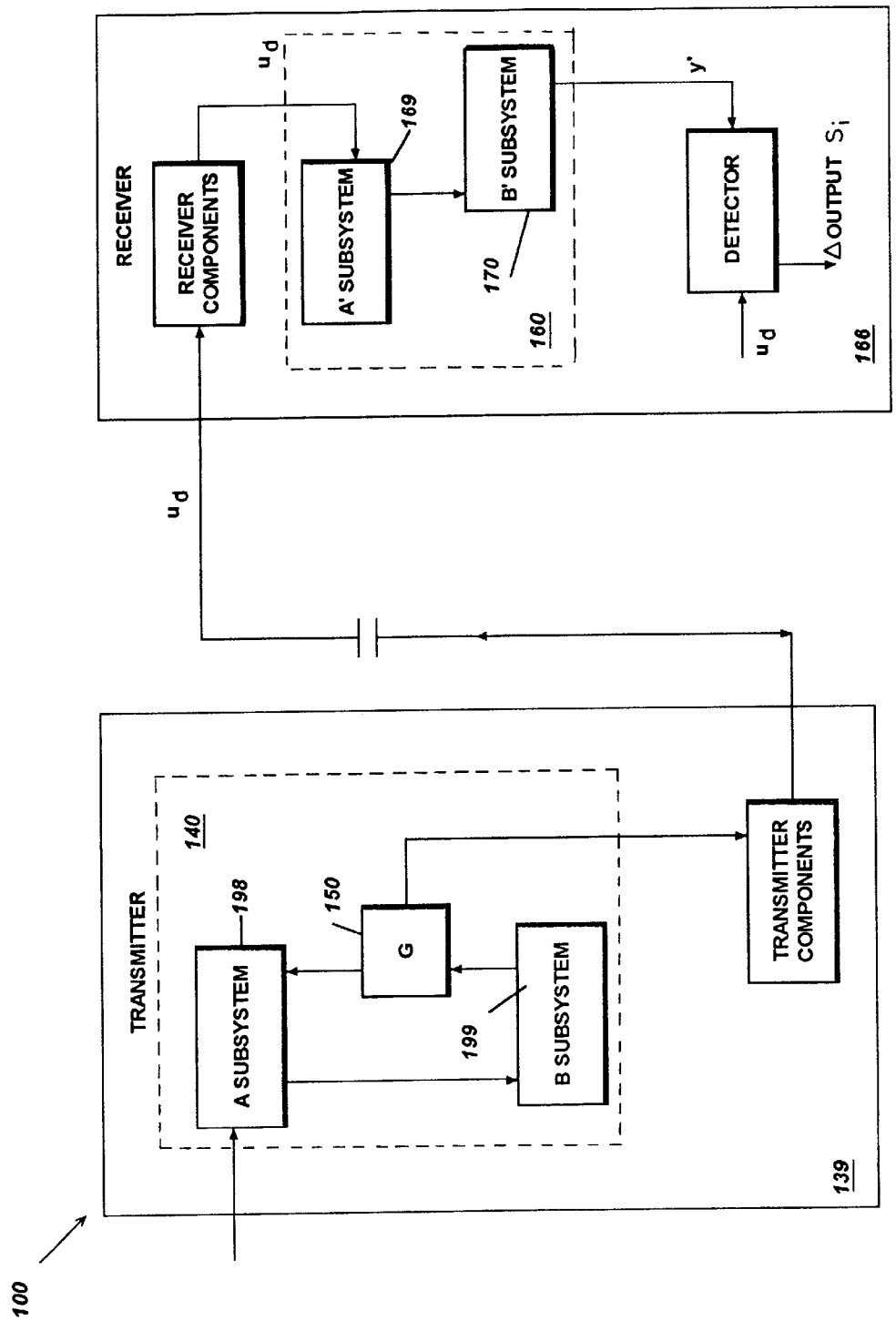
FIG. 1 is a block diagram of a cascaded chaotic circuit
Figure 2:
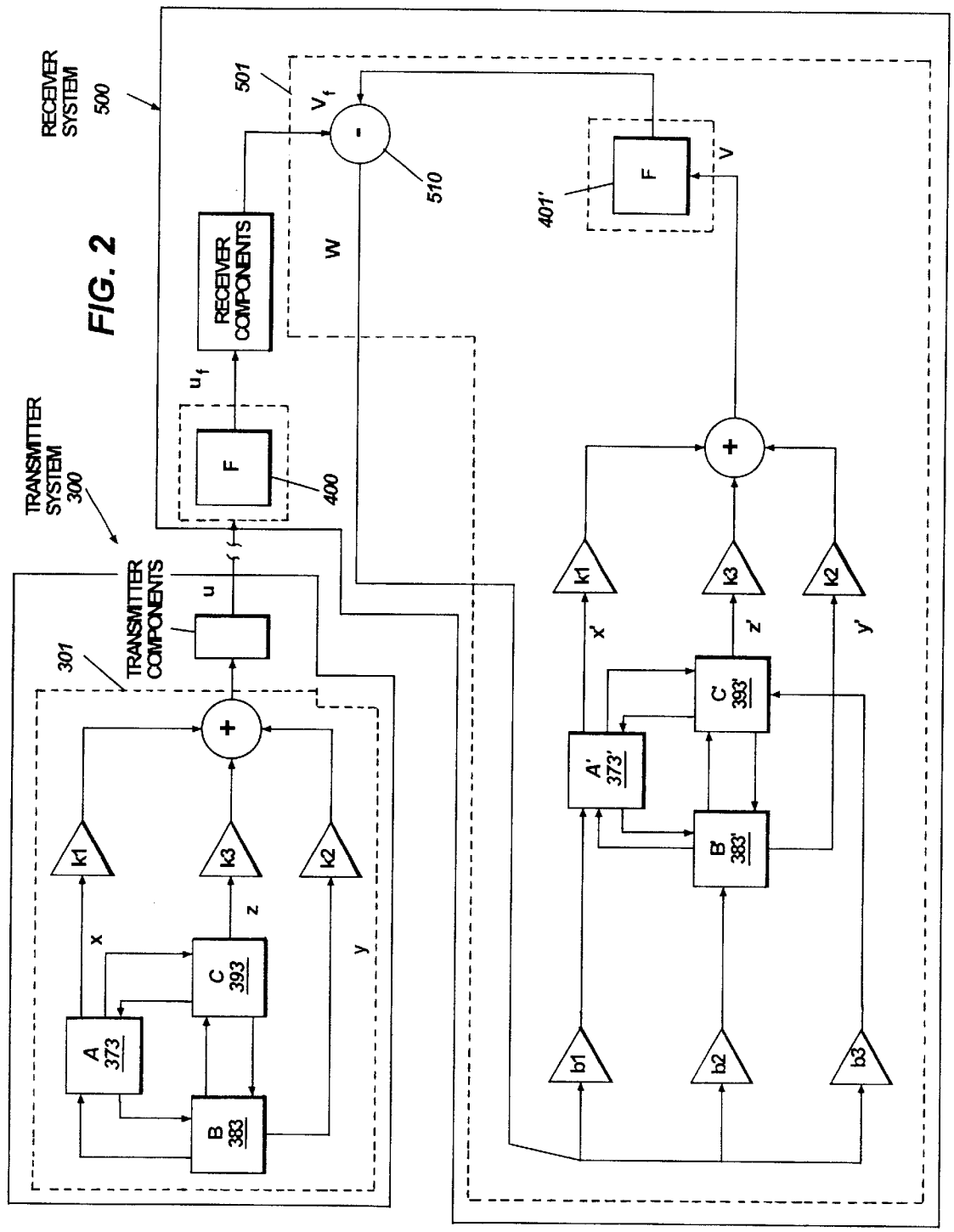
FIG. 2 is a block diagram of an autonomous cascaded chaotic circuit employing band pass filters

Referring to the remaining figures, wherein like references refer to like components, FIGS. 2, 3, 4, and 5 show a block diagrams of techniques of synchronizing chaotic systems using filters. The filter synchronized chaotic systems each comprise a chaotic drive circuit, and a chaotic response circuit. With reference to FIG. 2 which shows an embodiment comprising a Chaotic drive circuit 301 coupled to band pass filter circuit 400 producing a chaotic signal $u_f$. Chaotic drive circuit 301 is contained in a transmitter system 300 or other means for transmission. Drive circuit 301 is coupled to a filter circuit 400. Filter circuit may be contained in transmitter system or it may be housed in receiving system 500. In the embodiment illustrated in FIG. 2 the filter is contained in receiving system 500.

Receiving system 500 is coupled to transmitter system 300, and may be located remote from transmitter system 300. Receiving system 500, comprises filter circuit 400. Preferably filter circuit 400 is a band pass or band stop type filter, however any filter may be used. Receiving system 500 further comprises a response circuit, 501 which comprises subsystems which duplicate those which are contained in drive circuit 301 and a filter circuit 401 which is coupled to the output of response circuit 501 and shares a linear relationship to the filter circuit 400. Filter circuit 400 is coupled to a difference circuit 510 which combines the signal received from the drive circuit with a version of the signal produced by duplicate subsystems contained in the response circuit. Response system 500 further comprises a filter circuit 401 which is coupled to the combined output of the duplicate subsystems contained in the response circuit. Filter circuit is coupled to difference circuit 510, which combines output of the filter circuit 401 and the output of filter circuit 400. Response circuit 500 further contains gain elements, b1, b2 and b3, the input of each coupled to difference circuit 510 and the output of b1, b2 and b3 each coupled to one of the duplicate subsystems of response circuit.

Drive circuit 301 comprises subsystems A, B, and C, 373, 383, and 393 each of which and coupled in a cascaded configuration and together produce output signal x, y, and z, at least one of which has nonlinear or chaotic properties. Signals x, y, and z are multiplied by linear constants $k_1$, $k_2$, and $k_3$ and are combined to form a linear combination these signals u which may be expressed $u=k_1 x+k_2 y+k_3 z$. Cascaded drive circuit Sol formed by subsystem A 373, subsystem B 383, subsystem C 393, $k_1$, $k_2$, and $k_3$ and the linear combination output it produces are known in the art. Signal u is a chaotic broadband signal.

The orientation of subsystems 373, 383, and 393, each being driven by the other 2 subsystems eliminates the need for an independent driving chaotic signal, thus providing autonomous operation. No outside periodic driving source is required to drive the chaotic drive circuit.

In the present embodiment, the broadband chaotic signal U is then transmitted by the transmitter system 300 and received at a location remote from the transmitter by the receiver system 500. The receiver system 500, receives the broadband chaotic signal U and filters U producing a filtered chaotic signal $U_f$. $U_f$ features a narrow or reduced bandwidth in comparison to U. A benefit of this feature is that the information signal is contained within a broader band which increases reduces the chance of unauthorized decryption of the information signal. In other embodiments discussed supra, the signal is filtered prior to transmission, thus a narrowband signal is transmitted, offering benefits such as lower transmitter power requirements. However, in either configuration, the chaotic signal is synchronized using a chaotic signal using a narrow band.

Filter circuit 400 is preferably of the band pass or band stop type, however other filter circuit or a combinations of filter circuits may be used.

The response circuit 501, comprises subsystems A' 373', B' 383' and C' 393' which are duplicates of the subsystems contained in drive circuit 301 which combine to produce a linear combination of signals v. Using the sections of the response system identical to those in drive system 301, response system 501 creates v where v=$k_1$x'+$k_2$y'+$k_3$z'. The signal v is then passed through filter 401, which is identical or shares a linear relationship to the filter 400, and is used to generate the chaotic signal $U_f$. Filter 401 filters signal V to generates a filtered signal $V_f$.

In the configuration shown in FIG. 2 a band pass filter is used. Response system 501 then creates the signal w by taking the difference between $v_f$ and $u_f$, thus w=$u_f$−$v_f$. Signal w is then multiplied by constant values, $b_1$, $b_2$, and $b_3$ creating 3 different signals (signals reflecting a different gain), $b_1$ w, $b_2$ w and $b_3$ w. Signal $b_1$ w is then fed into A', the part of the response system that produced x', $b_2$ w is fed into B' the part of the response system that produced y' and $b_3$ w is coupled to the part of the response system that produced z'.

Figure 3:
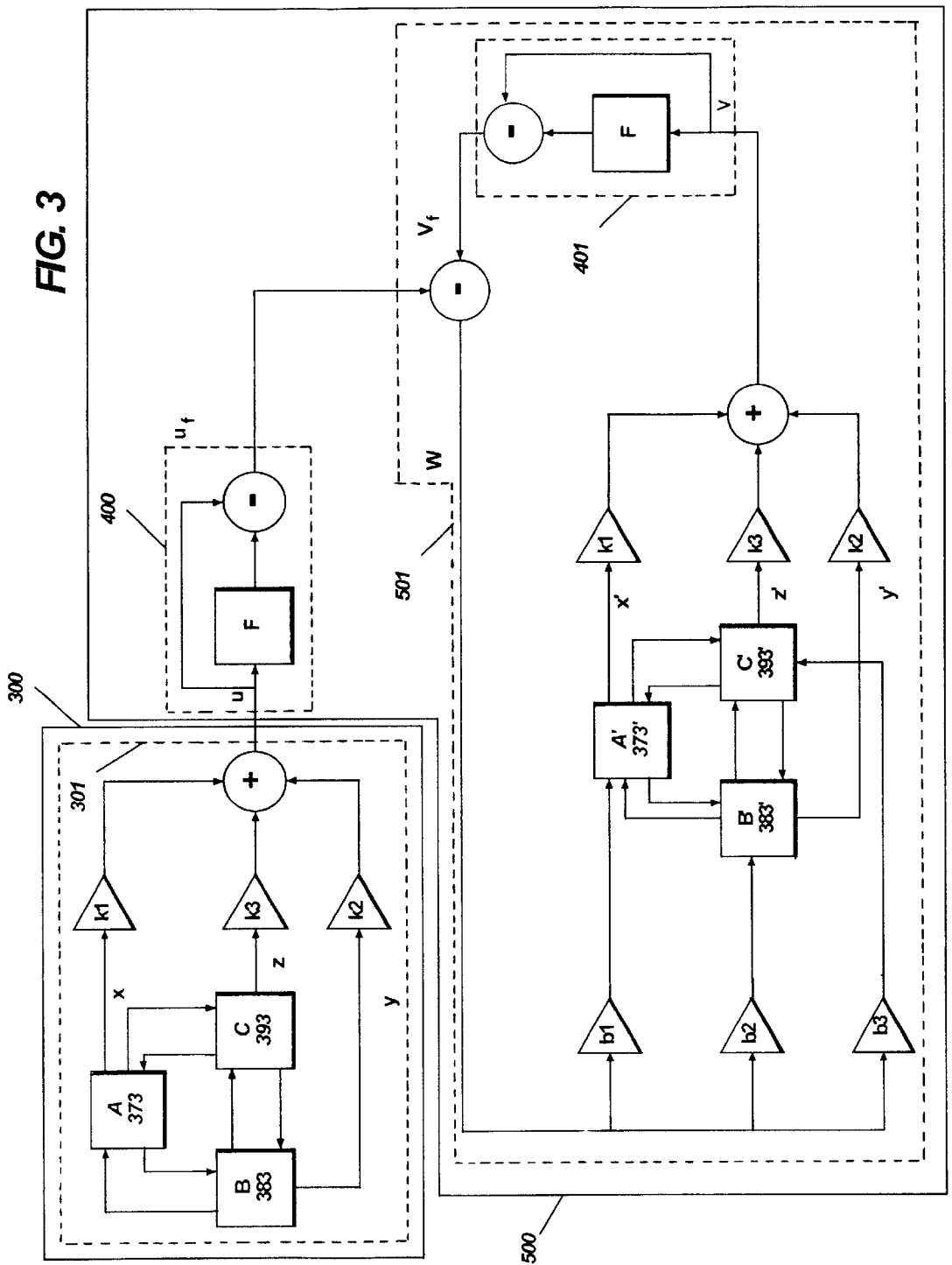
FIG. 3 is a block diagram of an autonomous cascaded chaotic circuit employing band stop filters

The values for $k_1$, $k_2$, $k_3$, $b_1$, $b_2$ and $b_3$ are selected to add stability to the system. If the response system is stable, it will synchronize. These values for $k_1$, $k_2$, $k_3$, $b_1$, $b_2$ and $b_3$ may be selected by combining any standard algorithm for computing Lyapunov exponents with a numerical minimization both known in the art. Routines such as those found in J. P. Eckmann and D. Ruelle, "Ergodic Theory of Chaos and Strange Attractors"Review of Modern Physics, vol 57 pp. 617–656 (1985) may be used for computing the Lyapunov exponents and routines such as those found W. H. press et al, "Numerical Recipes", (Cambridge, N.Y. 1990) may be used for the numerical minimizations. In the band pass embodiment one may use a regular bandpass filter as illustrated in FIG. 2 or employ a band stop filter and subtract the band stop filter output from u as shown in FIG. 3.

In a numerical example of the band pass embodiment the synchronization of the well known Lorenz equations are illustrated. The Lorenz equations are:

$$dx/dt=16(y-x) \quad (5)$$

$$dy/dt=-xz+45.92x-y \quad (6)$$

$$dz/dt=xy-4z \quad (7)$$

The signal u is formed as:

$$u=k_1x+k_2y+k_3z \quad (8)$$

Figure 10:
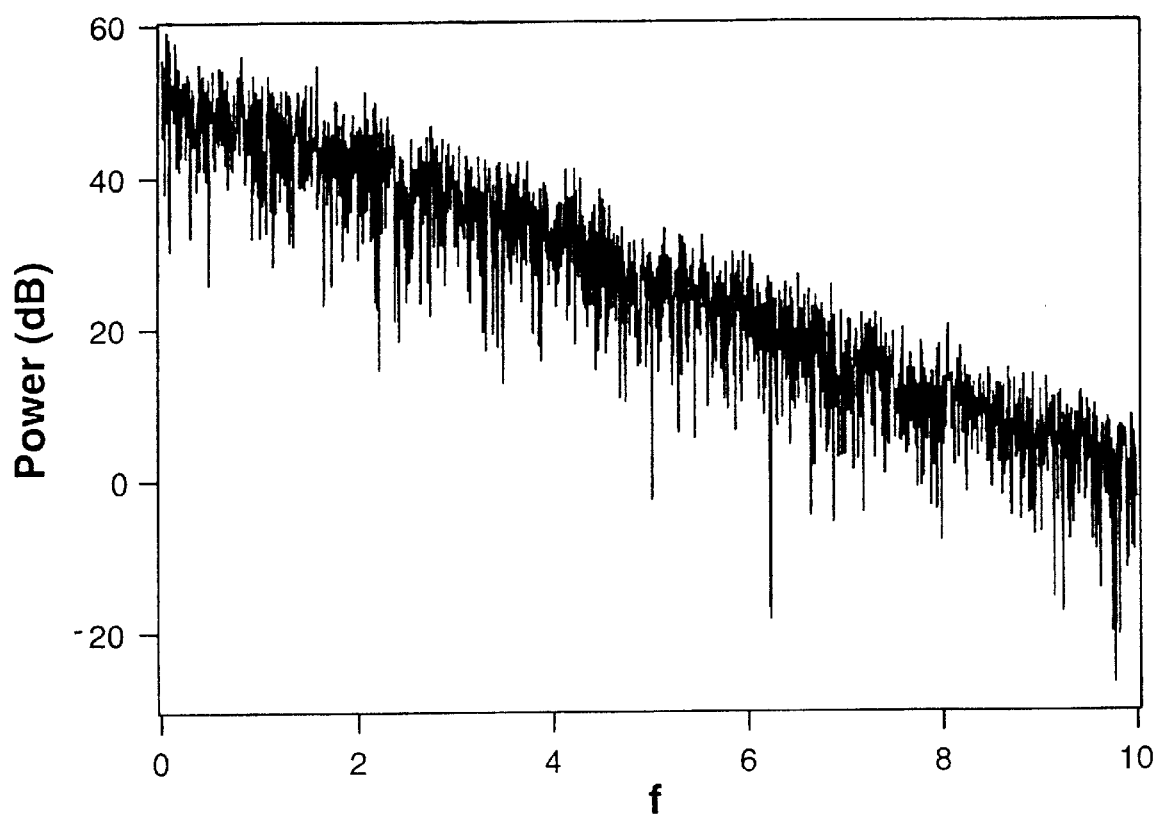
FIG. 10 is a graph of the power spectrum of u as a function of frequency.

Next the equations are numerically integrated with a $4^{th}$ order Runge-Kutta numerical integration routine as known in the art and discussed in (W. H. Press et al, "Numerical Recipes", (Cambridge, N.Y., 1990)). FIG. 10 shows the power spectrum of signal u. The signal u is then filtered through a band pass filter producing a filtered signal $u_f$. The filter variables are $h_1$ and $h_2$: expressed as follows:

$$dh/dt=2h_1/R_1-(1/2R_2)(1/R_3-1/R_1)h_2-(1/R_1)(du/dt) \quad (9)$$

$$dh_2/dt=h_1 \quad (10)$$

$$u_f=h_2 \quad (11)$$

Variables $h_1$ and $h_2$ represent a second order Butterworth band-pass filter. The resonant frequency of the filter is given by $(fr)2=(R_1+R_2)/(2\pi CR_1R_2R_3)$. The gain Ar=−$R_2/(2R_1)$, and the Q factor is Q=$\pi R_2$C. For equation 9, C=1, Q=20, Ar=−1 and $R_1$, $R_2$, and $R_3$ are set to select fr. The value for fr=5.4.

Figure 11:
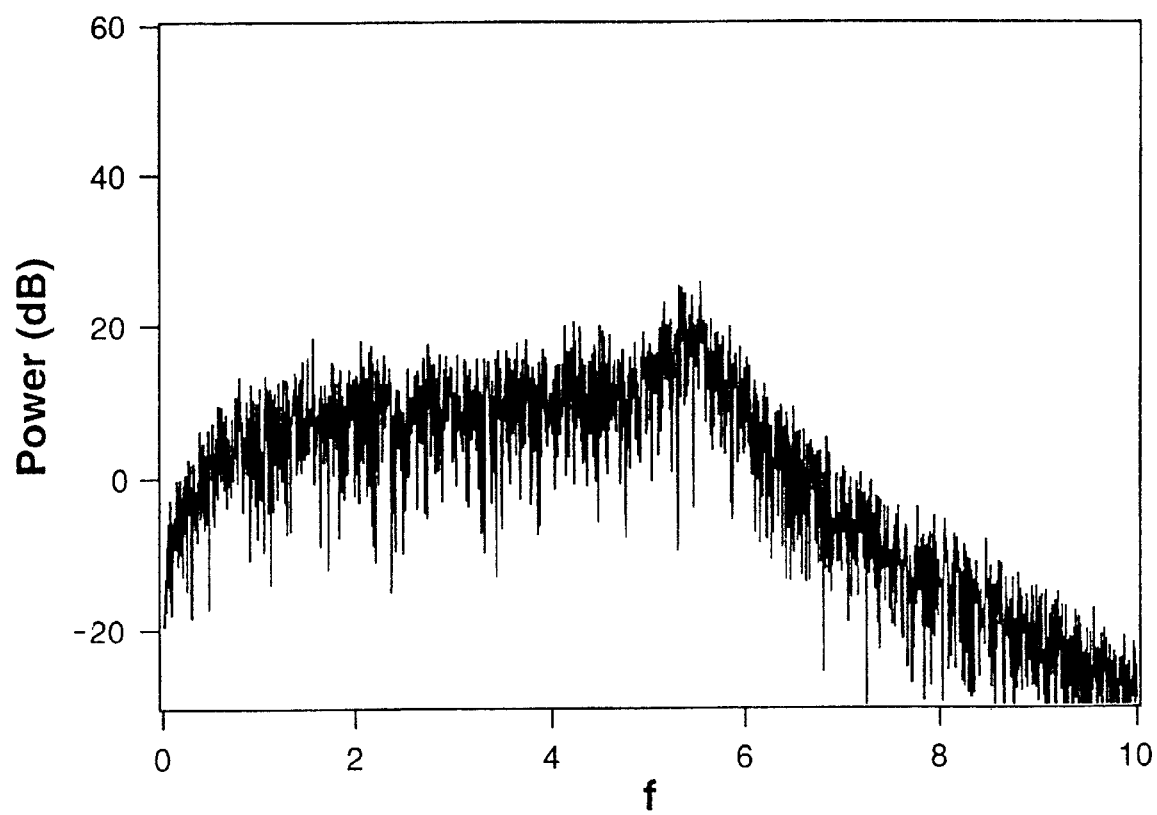
FIG. 11 is a graph of the power spectrum of $u_f$ as a function of frequency.

FIG. 11 shows a graph of the power vs. frequency of the filtered signal $u_f$ when fr=5.44. The reader should note that filtered signal $u_f$ illustrated in FIG. 11, reflects a reduced frequency band in comparison to the unfiltered graph of power vs frequency of u as illustrated in FIG. 10.

The response system is described by the equations:

$$dx'/dt=16(y'-x')+b_1w \quad (12)$$

$$dy'/dt=-x'z'+45.92x'-y'+b_2w \quad (13)$$

$$dz'/dt=x'y'-4z'+b_3w \quad (14)$$

$$v=k_1x'+k_2y'+k_3z' \quad (15)$$

$$dh'_1/dt=-2h'_1/R_1-(1/2R_2)(1/R_3-1/R_1)h'_2-(1/R_1)(dv/dt) \quad (16)$$

$$dh'_2/dt=h'_1 \quad (17)$$

$$v_f=h'_2 \quad (18)$$

$$w=u_f-v_f \quad (19)$$

Figure 9:
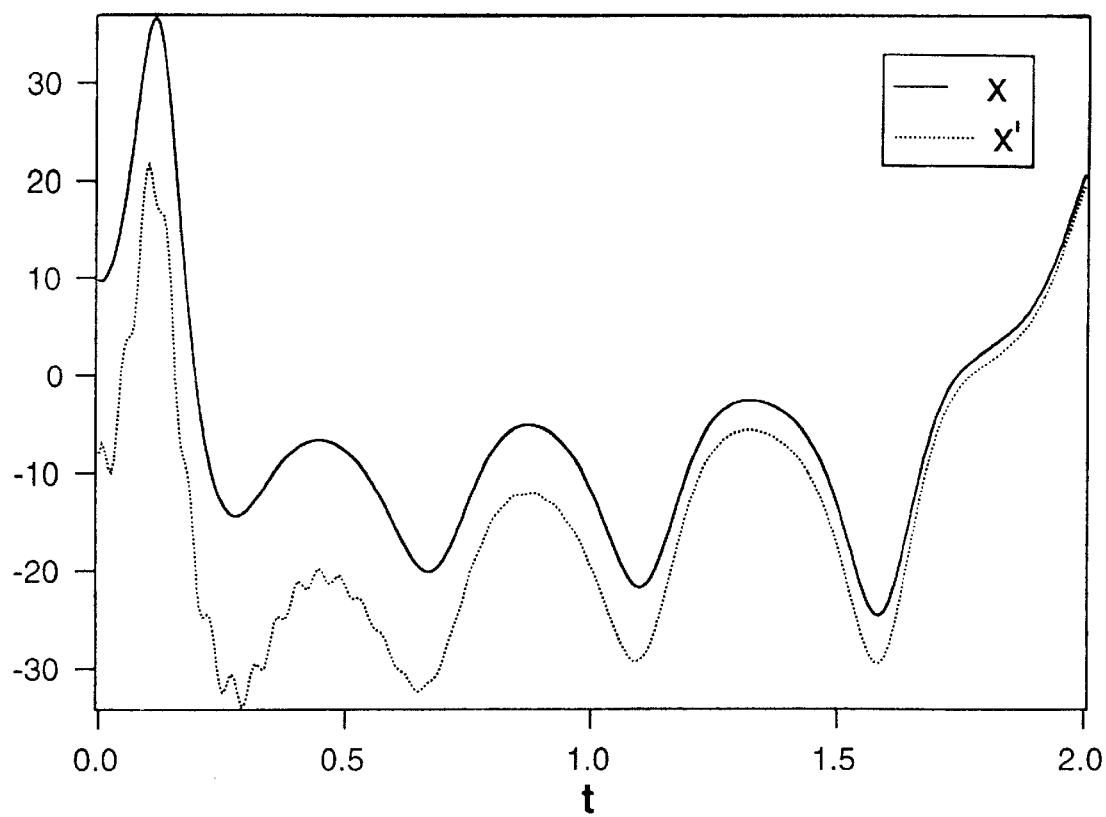
FIG. 9 is a graph of the synchronization of the x and x' terms in an example chaotic circuit.

The values for the $k_1$, $k_2$, $k_3$, $b_1$, $b_2$, and $b_3$ for which the response system is stable, are determined by minimizing the largest Lyapunov exponent for the response system using conventional minimization routines. In the present example $k_1$=273.0212, $k_2$=23.26557, $k_3$=16.24705, $b_1$=18.93643, $b_2$=20.51921, and $b_3$=3.04397, thus the largest exponent for the response system is −4.9523, and the response synchronizes to the drive. FIG. 9 shows a plot of the synchronization of the x' signal form the response system to the x signal from the drive system. The other terms, y and z, will synchronize when the x term synchronizes. There are a large number a k-b sets and a large number of fr's that will give synchronization.

Figure 12:
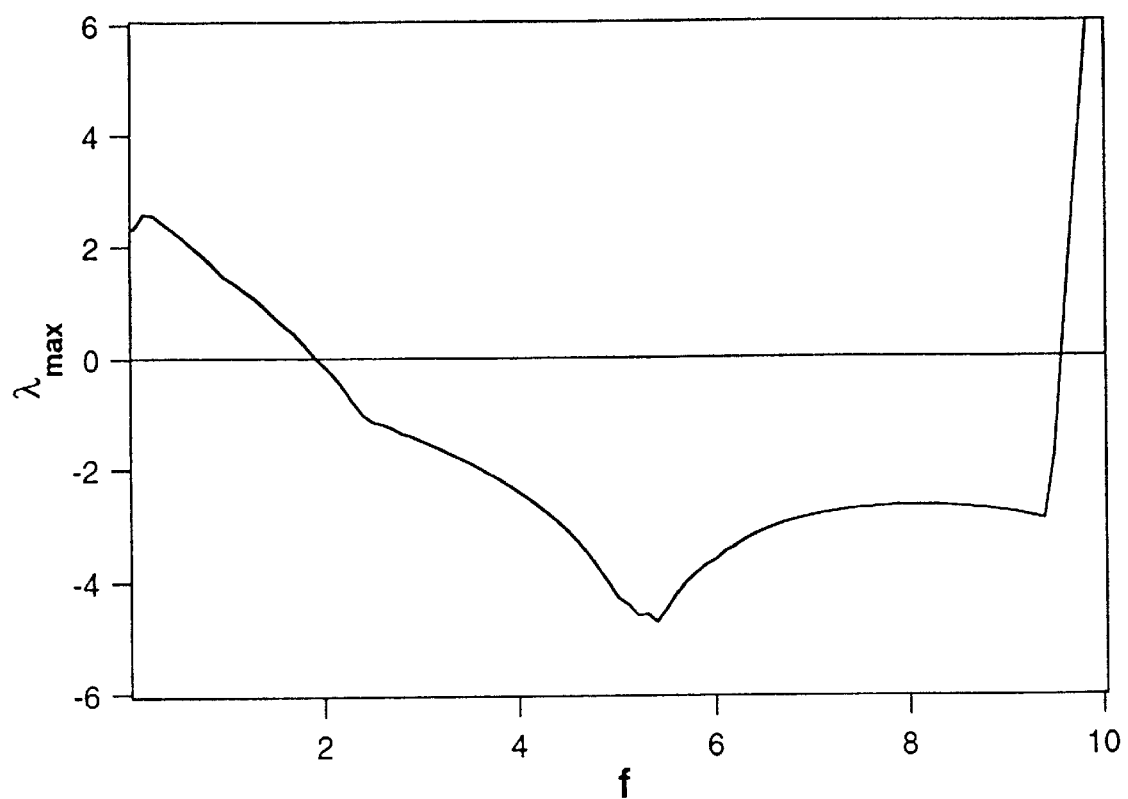
FIG. 12 is a plot of the largest Lyapunov exponent for the response system as a function of the bandpass filter frequency.

FIG. 12 is a plot of the largest Lyapunov exponent for the response system as a function of the bandpass filter frequency. $\lambda_{max}$ represent the maximum value of the Lyapunov exponent. The k's and b's are the same as the values listed above. The largest Lyapunov exponent for the response is negative over a broad range of fr, so many different filter frequencies are possible for a given set of k's and b's. Thus one may transmit one signal u to multiple chaotic response systems, each of which uses a bandpass filter with a different center frequency fr. If the transmission channel contains frequency dependent noise, one can compare the different response systems to improve the overall signal to noise ratio.

Figure 4:
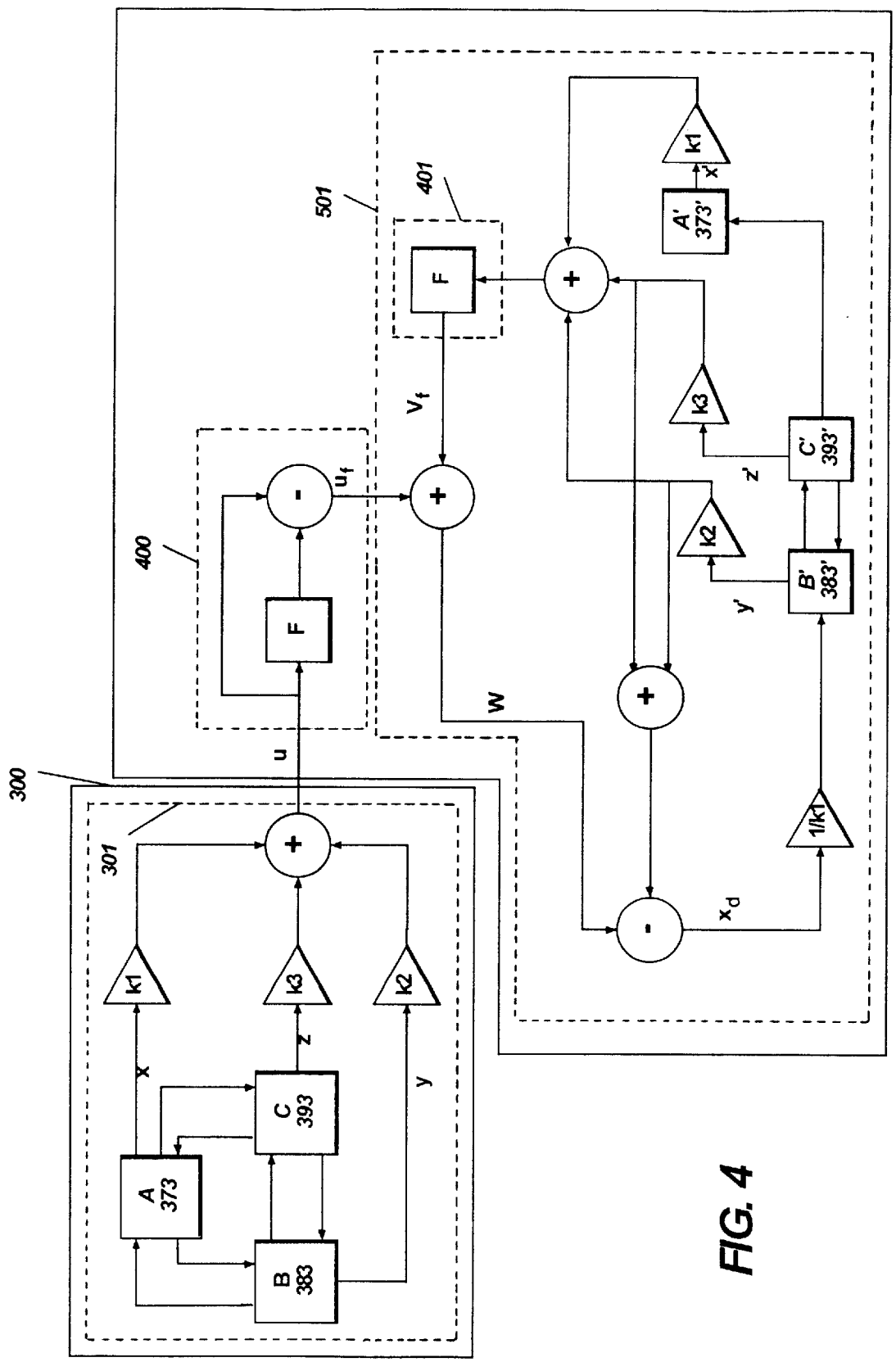
FIGS. 4 and 5 are block diagram of autonomous chaotic circuits employing band stop and band pass filters.
Figure 5:
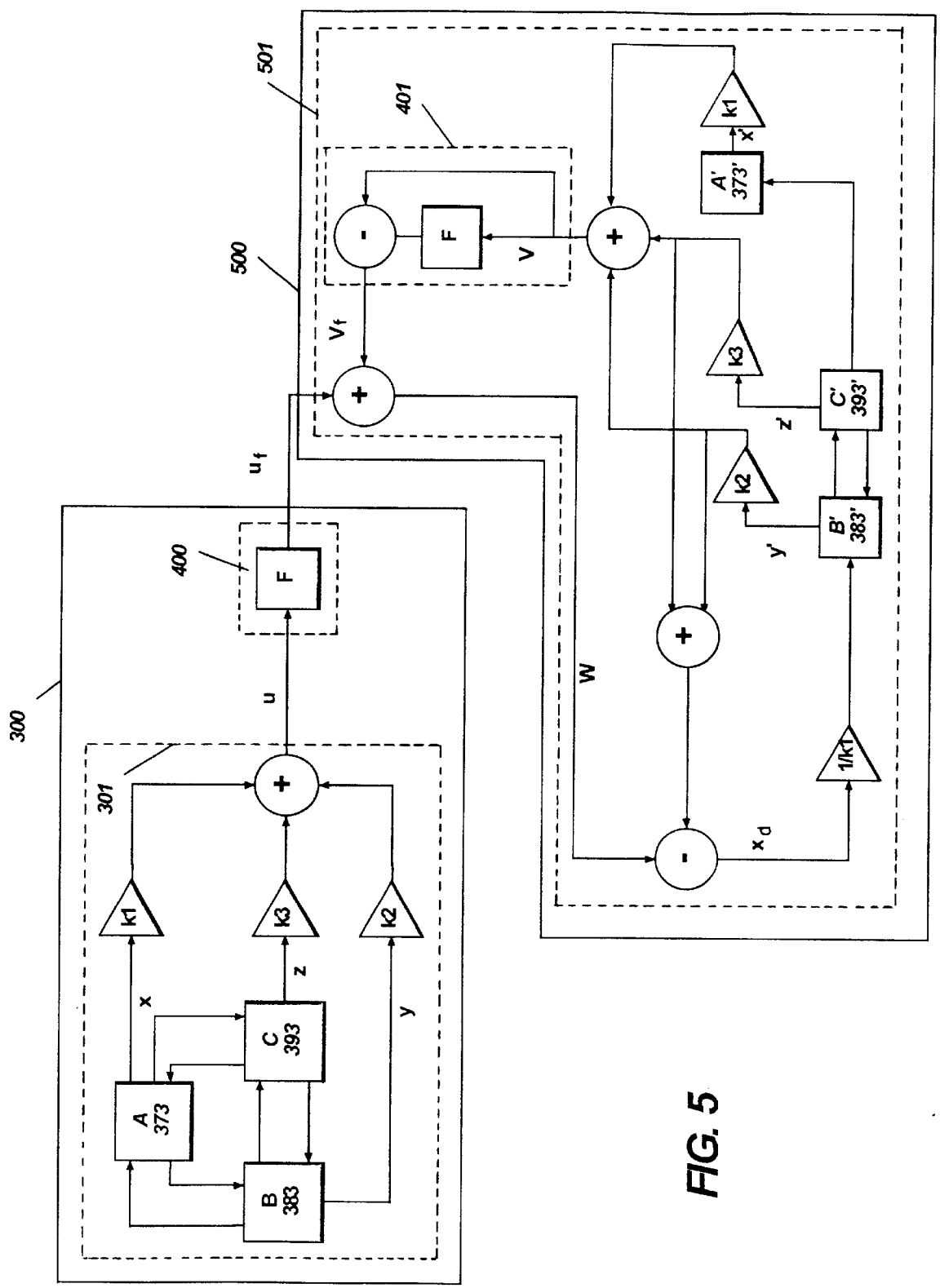

In an alternative embodiment for synchronization, one will keep only narrow band information from the drive signal u and keep only broadband information from the response signal v. As shown in FIG. 4, one way to do this is to pass u through the band stop filter and subtract the band stop output from u to produce $u_f$. The signal v from the response system is passed through a bandstop filter to produce $v_f$. The signal created is of the form w=$u_f$+$v_f$. When the drive and response systems are synchronized, w=u=v. One of the response variables may be replaced with its equivalent, reconstructed from w: for example x' in the response system may be replaced with xd=(w−k2y'−k3z')/k1. Similar substitutions may be possible for other variables. The constants $k_1$, $k_2$ and $k_3$ may be chosen so that the response system will synchronize.

Figure 6:
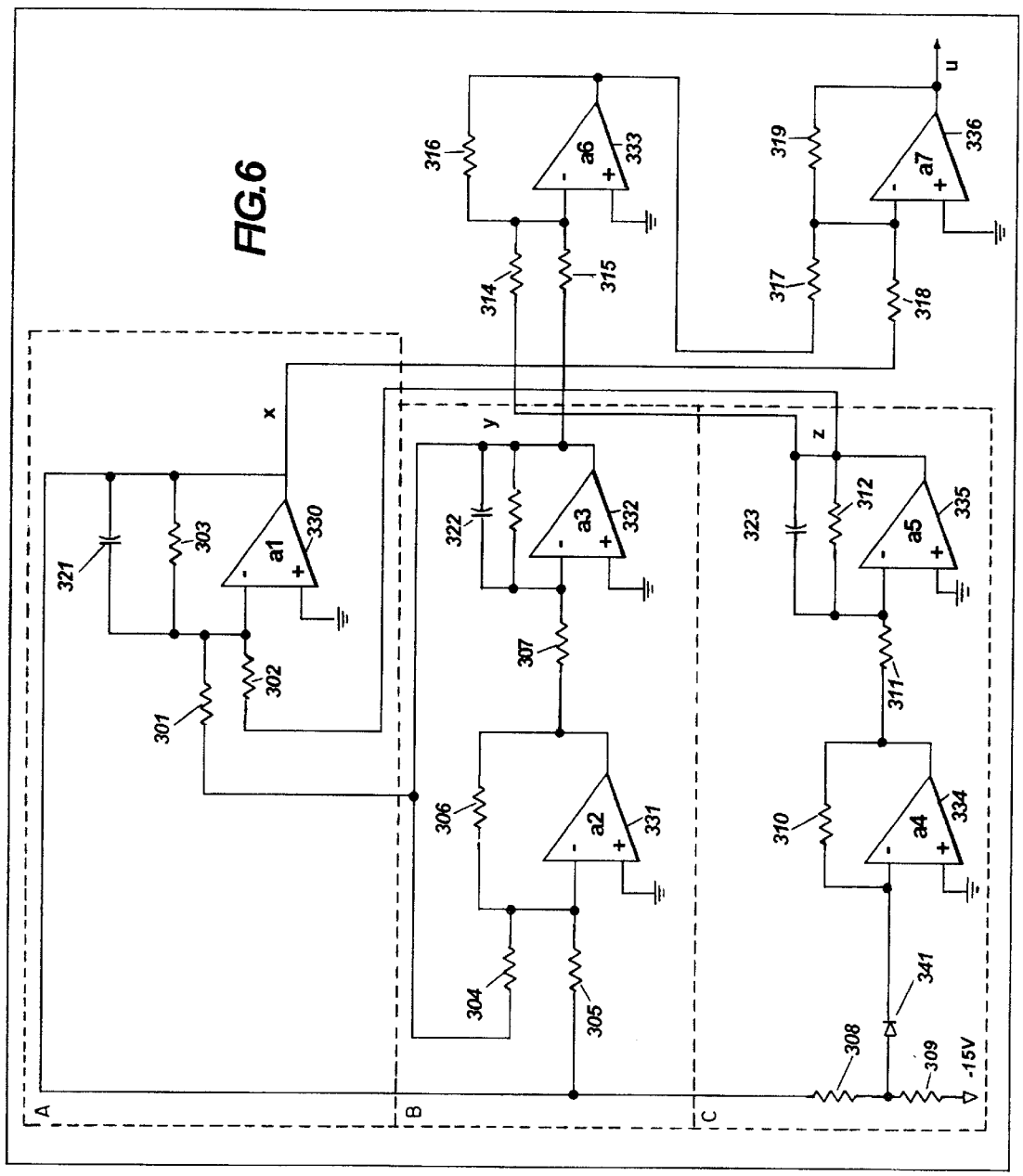
FIG. 6 is a schematic diagram of a autonomous cascaded drive circuit.
Figure 7:
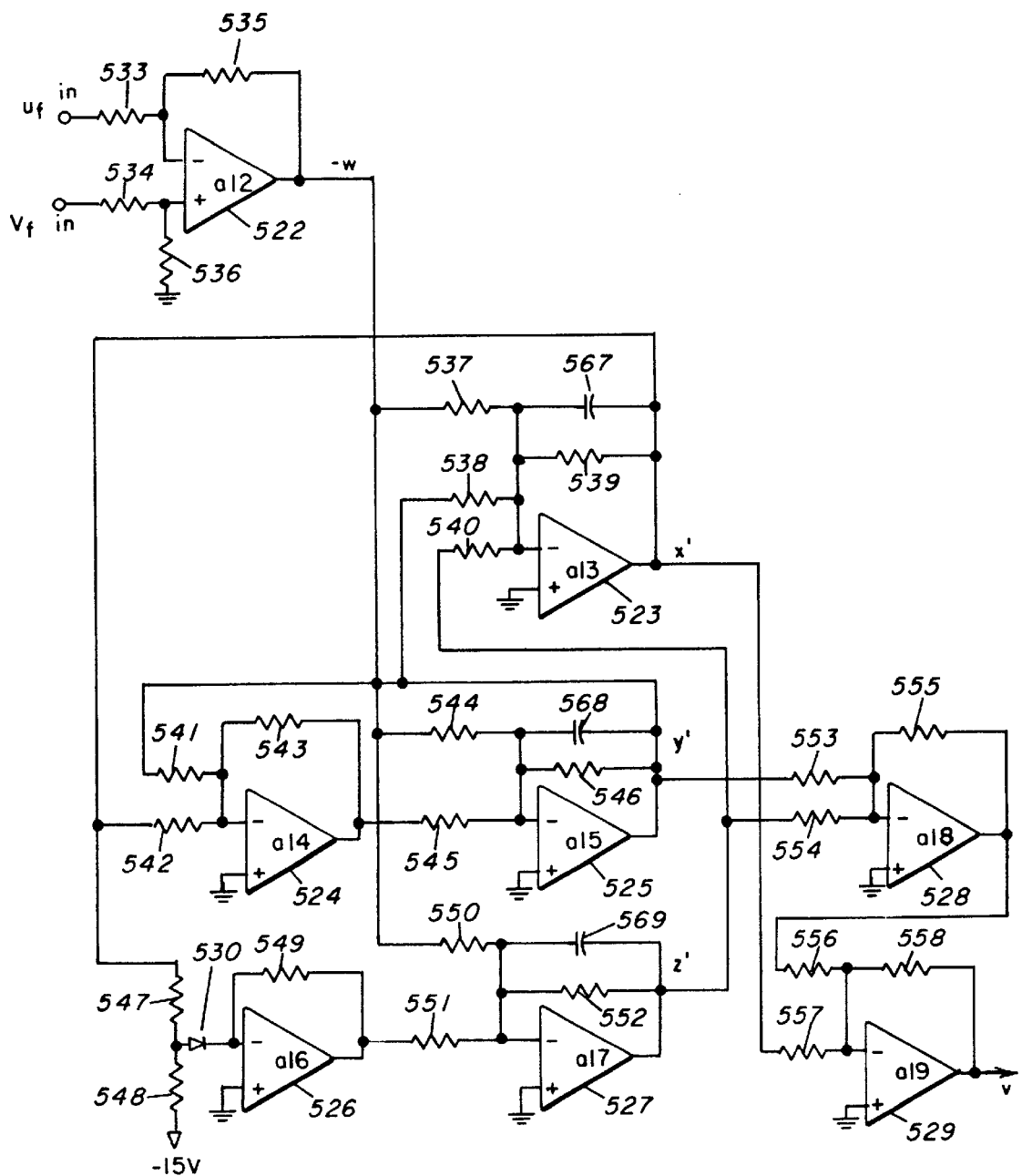
FIG. 7 is a schematic diagram of a cascaded response circuit.

As a specific example FIGS. 6 and 7 show an electrical drive and response circuit constructed in accordance with the system disclosed in FIG. 3. The drive circuit of FIG. 3 was described by:

$$dx_1/dt=10^4(0.05x_1+0.5x_2+x_3) \quad (20)$$

$$dx_2/dt=10^4(-x_1-0.11x_2) \quad (21)$$

$$dx_3/dt=-10^4(x_3+g(x_1)) \quad (22)$$

g(x)=0 if x<3, 15(x−3) otherwise $$u=(k_1x_1+k_2x_2+k_3x_3)/2 \quad (23)$$

The values of k are $k_1=-1.9$, $k_2=1.1$ and $k_3=1$.

Referring now to FIG. 6 which illustrates an example drive circuit. Drive circuit 301, comprises differential amplifiers 330, 332, and 335, which are coupled to resistors 301, 302, 303, 307, 311, 312 and capacitors 321, 322 and 323 form integrating circuits which correspond to subsystems 373, 383, and 393 as defined in FIGS. 2, 3, 4 and 5. Drive circuit 301 also comprises differential amplifier 331, which with resistors 304, 306, 305, 314, 316, 315, 317, 318 and 319 form a summer circuit which receives the output signals from subsystems 373, 383 and 393, are (x1, x2 and x3 in equations 20–23) x, y, and z using the combined signals to drive each subsystem with the output from the remaining two subsystems. The summer circuits constructed from 333 and 336 combine the x, y. and z signals to create output signal u, used as the chaotic drive signal. Signals x, y, and z are characteristic voltages of the drive circuit 301. Drive circuit 301 further comprises a nonlinear function constructed from differential amplifier 334, diode 341 and resistors 308 and 309. This nonlinear function is used to drive subsystem 393 causing the z signal to have a chaotic response resulting in the driving of signal U into chaos. In an experimental implementation of the chaotic system 300 which has been successfully tested, amplifiers 330–336 are operational amplifiers of type 741 or comparable.

The values for the example drive circuit are shown in table 1.

nized response circuit is made in accordance with the analysis described herein.

In operation drive circuit 300, produces a broad band chaotic output signal u, by driving each integrating circuit with the signals x, y, and z (referred to as $x_1$, $x_2$ and $x_3$ in equations 20–23) in a continuous feedback configuration. The integrating circuit which produces the z signal driven with a nonlinear function to produce a stable chaotic signal u.

Referring again to FIG. 3 the chaotic signal u produced by drive circuit 301 passes through filter 400. In this embodiment a band stop filter 400 is used, however other filters, such band pass type filters may be used. In the band stop configuration one may subtract the bands passed from the band stopped to produce the narrowband signal.

Figure 8:
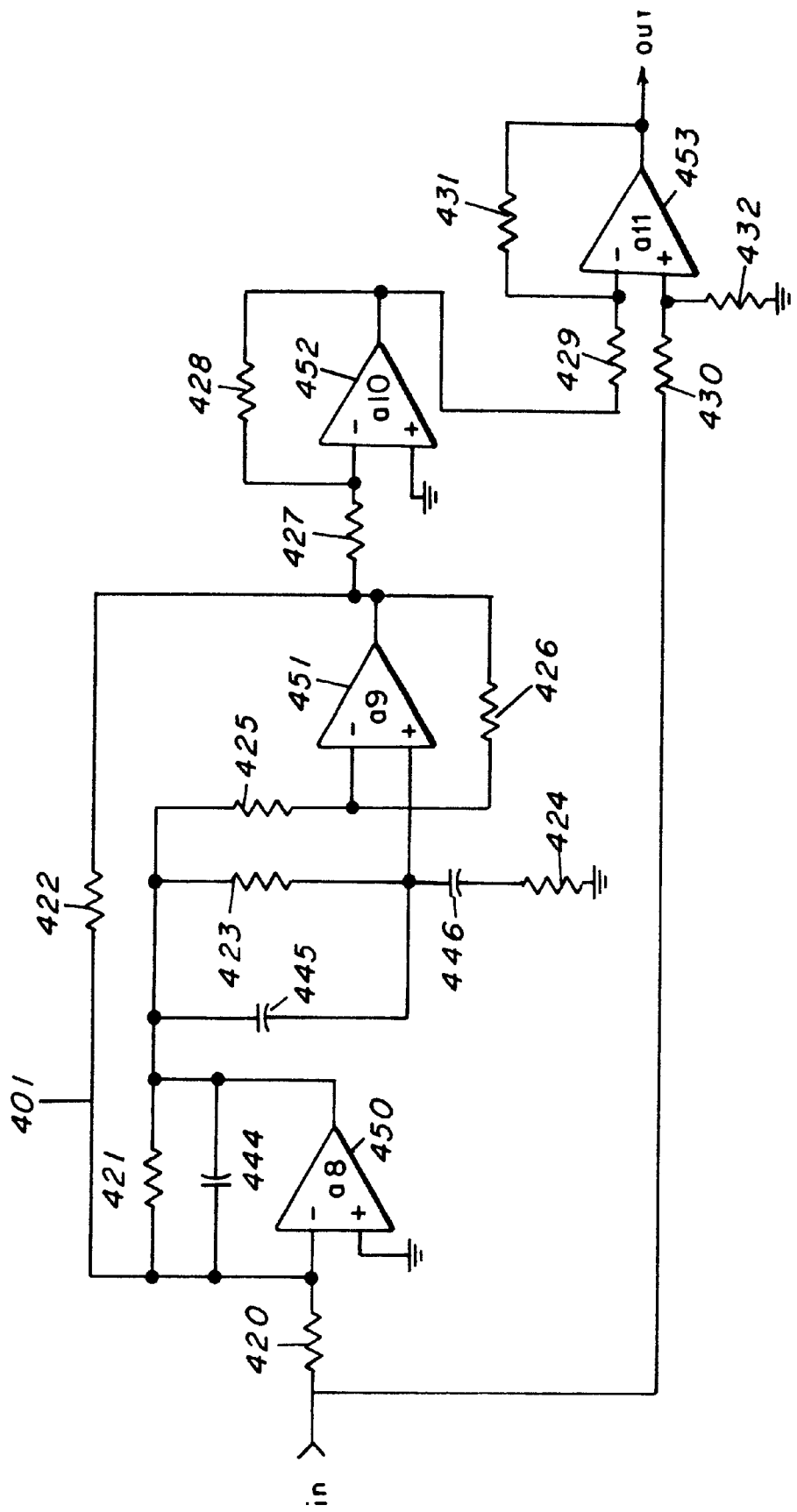
FIG. 8 is a schematic diagram of a band-stop filter.

FIG. 8, shows a schematic of an example filter circuit 400. The filter circuit shown is a Wien-Robinson bandstop filter. The device is configured to subtract the filter's output from the complete signal to achieve a narrow band chaotic signal. Filter 400 is described by the equations:

$$dx_4/dt=-(1/RC)(3x_4/(1+a_1)+x_5+b_1u/(1+a_1)-[RCb_1/(1+a_1)]d^2u/dt^2) \quad (24)$$

$$dx_5/dt=x_4/(RC) \quad (25)$$

$$u_f=u+x_5 \quad (26)$$

The gain of the bandstop part of filter 400 is $A_0=-b1/(1+a_1)$, the Q factor is $(1+a_1)/3$, and the center frequency is fr=1/($2\pi RC$). The gain is set to −1 and the Q to 7. The capacitor C is 0.01 μf, the value of C444, C445 or C446. The variable b1=R421/R420 and a1=R421/R422. R, the value of R423 and R424 is chosen to set fr to the peak frequency in the circuit of equation 24. For a center frequency of 1145 Hz, R=14,179 ohms.

The circuit example shown in FIG. 8 features and input comprising an integrator circuit with resistor 420, 421, and 422 and capacitor 444 coupled to the negative terminal of amplifier 450. Resistor 421, and capacitor 444 are also coupled to the output of amplifier 450. The output of amplifier 450 is also coupled to the negative input terminal of amplifier 451 via resistor 425. The output of amplifier 450 is coupled to the positive terminal of amplifier 451 via capacitor 445 and resistor 423 through a common node. Capacitor 446 is also coupled to the same node. Resistor 424 is coupled to capacitor 446 through yet another node. The output of amplifier 451 shares a common node with resistor 422, 426 and 427. Amplifier 451 through resistor 427 drives the negative terminal of amplifier 452. The output terminal of amplifier 452 is coupled to resistors 428 and 429, with resistor 428 coupled in a feedback configuration to the

TABLE 1

| | | | | | |
|---|---|---|---|---|---|
| 301 = 200 kΩ | 305 = 10 kΩ | 309 = 68 kΩ | 313 = 5 MΩ | 317 = 100 kΩ | 322 = 1000 pf |
| 302 = 100 kΩ | 306 = 10 kΩ | 310 = 150 kΩ | 314 = 200 kΩ | 318 = 125 kΩ | 323 = 1000 pf |
| 303 = 2 MΩ | 307 = 100 kΩ | 311 = 100 kΩ | 315 = 182 kΩ | 319 = 100 kΩ | 341 = MV2101 diode |
| 304 = 75 kΩ | 308 = 10 kΩ | 312 = 100 kΩ | 316 = 100 kΩ | 321 = 100 pf | |

Drive circuit 301 and response circuit 501 are subdivided into 3 subsystems 373, 383, and 393, however, this is not necessary and the division of each circuit into subparts in order to determine the proper configuration for a synchronegative terminal of amplifier 452 in a common node with resistor 427 and driving the negative terminal of amplifier 453 by way of resistor 429. Resistors 430 and 432 a coupled in a common node with the positive terminal of amplifier 453. The output of amplifier 453 is fed back into the negative terminal of amplifier 453 via resistor 431. The output of the filter 400 is taken at the output of amplifier 453 and the input of the filter 400 is a common node formed by resistor 420 and resistor 430.

Referring again to FIG. 3 and to FIG. 8, in this example embodiment filters 400 and 401 are identical the only difference being the input signal. In FIG. 3 the drive signal u is coupled to filter 400 which filters signal u to produces the signal $u_f$. Filtered signal $u_f$ features chaotic characteristics, however signal $u_f$ features a reduced bandwidth in comparison to signal u. Filter 401 is coupled to the response system and produces a filtered signal $v_f$ as its output. The signal $v_f$ is used to synchronize the chaotic drive with the chaotic response. For the configuration disclosed in FIG. 3, using dual BUTTERWORTH filters, when w=0 the system is synchronized. The values for the example band stop filter circuit are shown in table 2.

TABLE 2

| | | | |
|---|---|---|---|
| 420 = 1 MΩ | 424 = 14,179 Ω | 428 = 100 kΩ | 432 = 100 kΩ |
| 421 = 1 MΩ | 425 = 100 kΩ | 429 = 100 kΩ | 444 = 100 pf |
| 422 = 50 kΩ | 426 = 200 kΩ | 430 = 100 kΩ | 445 = 1000 pf |
| 423 = 14,179 Ω | 427 = 12,500 Ω | 431 = 100 kΩ | 446 = 1000 pf |

Referring again to FIG. 3, the filtered signal is received by response circuit 501. Response circuit, comprises a section identical to drive circuit 300 producing signal V as it output. V then passe through filter 401 to produce signal $V_f$. Filtered $V_f$ is subtracted from the signal received from drive circuit 301 and coupled back into response circuit 501.

FIG. 7 is a schematic diagram of response circuit 501. The input of response circuit 501 is coupled to a difference circuit comprising of amplifier 522 coupled to resistors 533, 534, 535 and 536. The $V_f$ input signal is coupled to amplifier 522 via resistor 534. The $u_f$ input is coupled to amplifier 522 via resistor 533. The output of amplifier 522 is coupled to input of integrator circuits formed by amplifiers 523, 525, and 527. Amplifiers 523, 525, and 527 form subsystems 373', 383', and 393' corresponding duplicates to subsystems 373, 383, and 393 contained in drive circuit 301. Summer circuits are formed by amplifier 524 via resistors 541, 542 and 543, amplifier 528, resistor 553–555 and amplifier 529 and resistors 556–558 are likewise identical to the summer circuits contained in drive circuit 301.

Response circuit 501 may be described by the following equations:

$$dx'_1/dt = -10^4(0.05x'_1 + 0.5x'_2 + x'_3) + 2b_1 w \quad (27)$$

$$dx'_1/dt = -10^4(-x'_1 0.11x'_2) + 2b_2 w \quad (28)$$

$$dx'_3/dt = -10^4(x'_3 + g(x'_1)) + 2b_3 w \quad (29)$$

$$v = (k_1 x'_1 + k_2 x'_2 + k_3 x'_3)/2 \quad (30)$$

$$dx'_4/dt = (1/RC)(3x'_4/(1+a_1) + x'_5 + b_1 v/(1+a_1)) - [RCb_1/(1+a_1)]d^2v/dt^2 \quad (31)$$

$$dx'_5/dt = x'_4/RC \quad (32)$$

$$v_f = v + x'_5 \quad (33)$$

$$w = u - v \quad (34)$$

Where the b values are $b_1=1$, $b_2=1$, $b_3=1$. The values for the example response circuit are shown in table 3.

TABLE 3

| | | | | | |
|---|---|---|---|---|---|
| 533 = 100 kΩ | 538 = 200 kΩ | 543 = 10 kΩ | 548 = 68 kΩ | 553 = 182 kΩ | 558 = 100 kΩ |
| 534 = 100 kΩ | 539 = 2 MΩ | 544 = 50 kΩ | 549 = 150 kΩ | 554 = 200 kΩ | 527 = 1000 pf |
| 535 = 100 kΩ | 540 = 100 Ω | 545 = 100 kΩ | 550 = 50 kΩ | 555 = 100 kΩ | 528 = 1000 pf |
| 536 = 100 kΩ | 541 = 75 kΩ | 546 = 5 MΩ | 551 = 100 kΩ | 556 = 100 kΩ | 529 = 1000 pf |
| 537 = 50 kΩ | 542 = 10 kΩ | 547 = 10 kΩ | 552 = 100 kΩ | 557 = 125 kΩ | 530 = MV210 1 diode |

Referring again to FIGS. 3, 6, 7, and 8 drive system 301 is preferably be housed in a transmitter 300, the chaotic signal U created by drive system 301 is transmitted to receiver 500, which comprises, filter 400, response circuit 501 and filter 401. Receiver 500 receives the transmitted signal u and uses filter 400 to filter signal u producing signal $u_f$. Signal $u_f$ is a narrow band chaotic signal and is used to synchronize drive circuit 301 with response circuit 501. Response circuit 501 produces a chaotic signal v, which is filtered by filter 401 to produce signal $v_f$. Signal $v_f$ is combined with signal $u_f$ to produce signal W. Signal W is used to drive response circuit 501. Response circuit 501 compares narrow band signal $u_f$ to narrow band signal $v_f$ to determine synchronization. A plot of the synchronization of an example chaotic system as described in FIG. 3 is shown in FIG. 9. The drive circuit 301 is as described in FIG. 6 and the example response circuit 501 is as described in FIG. 7. Filters, 400 and 401 are as described in FIG. 8.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letter of Patent of the United States is:

1. A synchronized chaotic system comprising:

a transmitter, said transmitter having at least one nonlinear element, for transmitting a signal along a transmission path, a nonlinear signal produced by said at least one nonlinear element, a means for filtering said transmitted nonlinear signal, said means for filtering located in the transmission path, a receiver, coupled to said transmitter, said receiver comprising a duplicate of said at least one nonlinear element said receiver receiving the filtered said nonlinear signal from said transmitter, said duplicate of said at least one nonlinear element producing a second nonlinear signal, said receiver further comprising a second means of filtering, said second means for filtering, filtering said second nonlinear signal, wherein said receiver uses said second filtered signal to synchronize with said nonlinear signal produced by said transmitter.

2. A synchronized chaotic system comprising:

a transmitter having at least two subsystems coupled to drive the other, at least one of said at least two subsystem having a nonlinear response, said transmitter transmitting a chaotic signal along a transmission path, a filter circuit coupled to said transmitter said filter circuit narrowing the bandwidth of said chaotic signal, said filter circuit located in the transmission path, a receiver having at least two subsystems, at least two of said subsystems in said receiver being identical to said transmitter subsystems, said receiver receiving said narrowband chaotic signal from said filter circuit, said receiver using said at least two identical subsystems to produce a second chaotic signal, a second filter circuit coupled to said receiver, said second filter circuit filtering said second chaotic signal producing a second narrowband chaotic signal, wherein said received narrowband chaotic signal is compared to said second narrowband chaotic signal, said receiver using said received narrow band chaotic signal to synchronize with said transmitter.

3. The system of claim 2 wherein said transmitter comprises a chaotic drive circuit, said chaotic drive circuit comprising said transmitter subsystems and said receiver comprises a chaotic response circuit, said chaotic response circuit comprising said receiver subsystems.

4. The system of claim 3 wherein both of said filter circuits are contained within said receiver.

5. The system of claim 3 wherein said filter circuits are bandpass filters.

6. The system of claim 3 wherein said filter circuits are band stop filters.

* * * * *